United States Patent
Suganuma et al.

(10) Patent No.: US 8,332,138 B2
(45) Date of Patent: Dec. 11, 2012

(54) ROAD INFORMATION ACQUISITION DEVICE AND ROAD INFORMATION ACQUISITION METHOD

(75) Inventors: Hideaki Suganuma, Yokohama (JP); Mamoru Kuraishi, Ome (JP); Kazunao Yamada, Toyota (JP); Takashi Naitou, Okazaki (JP); Toshiaki Niwa, Okazaki (JP); Masatoshi Takahara, Okazaki (JP); Fumiharu Ogawa, Okazaki (JP)

(73) Assignees: Toyota Jidosha Kabushiki Kaisha, Toyota-shi (JP); Denso Corporation, Kariya-shi (JP); Aisin AW Co., Ltd., Anjo-Shi (JP)

( * ) Notice: Subject to any disclaimer, the term of this patent is extended or adjusted under 35 U.S.C. 154(b) by 540 days.

(21) Appl. No.: 12/609,311

(22) Filed: Oct. 30, 2009

(65) Prior Publication Data

US 2010/0114474 A1 May 6, 2010

(30) Foreign Application Priority Data

Oct. 30, 2008 (JP) .................................. 2008-280024

(51) Int. Cl.
*G01C 21/00* (2006.01)
(52) U.S. Cl. ........ 701/408; 701/423; 701/532; 701/533; 340/995.19; 340/988; 340/995.24; 340/991; 340/995.23
(58) Field of Classification Search .................. 701/65, 701/80, 423, 532, 533; 340/995.19, 988, 340/995.24, 991, 99.12, 995.23
See application file for complete search history.

(56) References Cited

U.S. PATENT DOCUMENTS

| 6,005,494 | A | * | 12/1999 | Schramm | 340/995.19 |
| 7,493,209 | B1 | * | 2/2009 | Altrichter et al. | 701/423 |
| 2004/0243305 | A1 | * | 12/2004 | Kozak | 701/209 |
| 2007/0188409 | A1 | * | 8/2007 | Repetto et al. | 345/30 |
| 2008/0183383 | A1 | | 7/2008 | Asai et al. | |
| 2010/0114474 | A1 | * | 5/2010 | Suganuma et al. | 701/200 |
| 2010/0324752 | A1 | | 12/2010 | Suganuma et al. | |

FOREIGN PATENT DOCUMENTS

| JP | 2004037141 A | | 2/2004 |
| JP | 2004-252152 A | | 9/2004 |
| JP | 2004325777 A | | 11/2004 |
| JP | 2004325777 A | * | 11/2004 |
| JP | 2008-032598 A | | 2/2008 |
| JP | 2008-089606 A | | 4/2008 |
| JP | 2008-191718 A | | 8/2008 |
| JP | 2009-236714 A | | 10/2009 |

OTHER PUBLICATIONS

Office Action in Japanese Pat. Appl. No. 2008-280024 drafted Apr. 27, 2012 and partial English translation thereof.

* cited by examiner

*Primary Examiner* — Redhwan K Mawari
(74) *Attorney, Agent, or Firm* — Gifford, Krass, Sprinkle, Anderson & Citkowski, P.C.

(57) ABSTRACT

A road information acquisition device includes: a surface elevation acquisition unit that obtains a surface elevation; a road information acquisition unit that calculates first road information relating to a travel route to be traveled by a host vehicle on the basis of the surface elevation; and a structure determination unit that determines whether or not a structure exists on the travel route, wherein, when the structure determination unit determines that the structure exists on the travel route, the road information acquisition unit obtains second road information, which is different from the first road information, relating to a point at which the structure exists on the travel route.

8 Claims, 12 Drawing Sheets

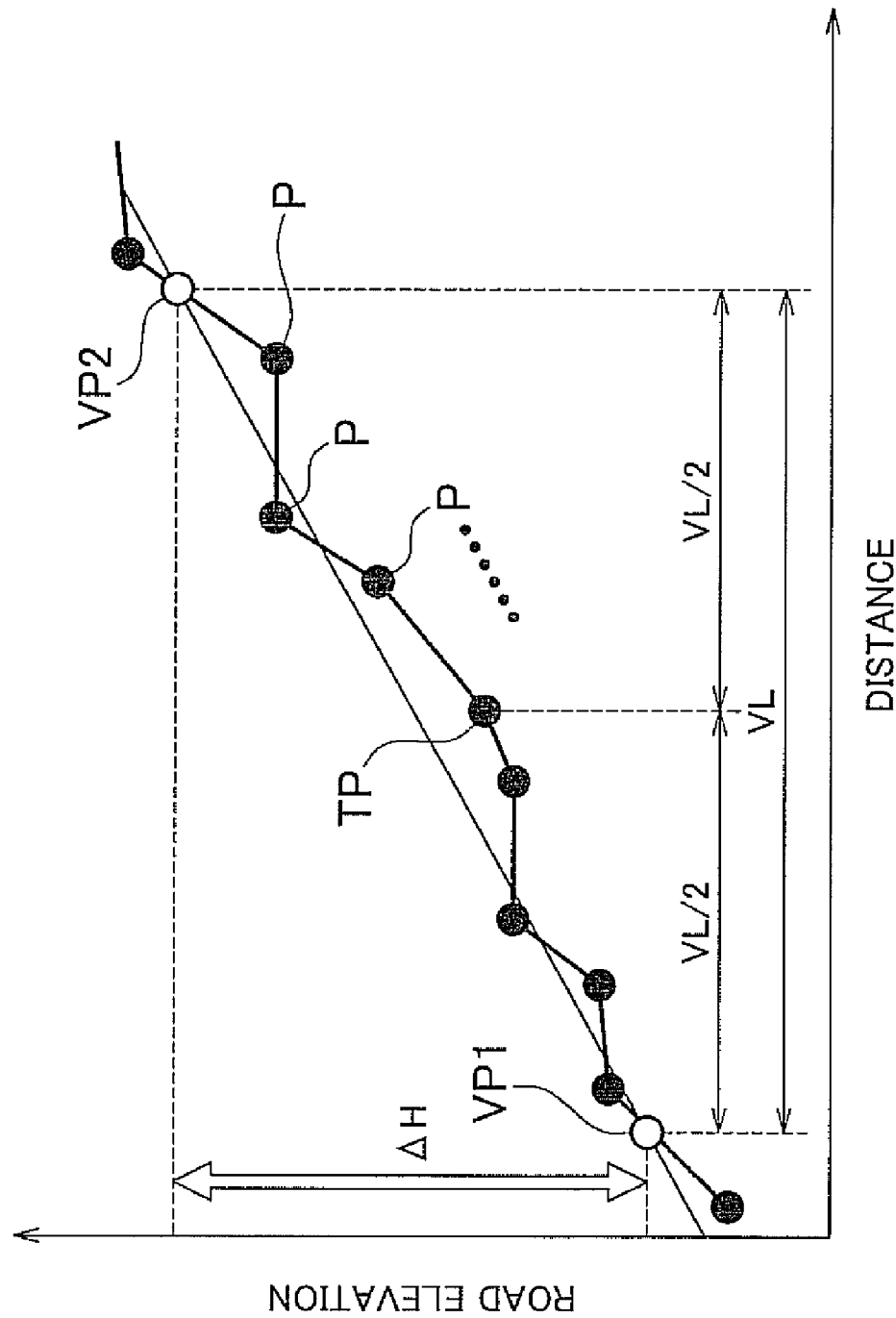

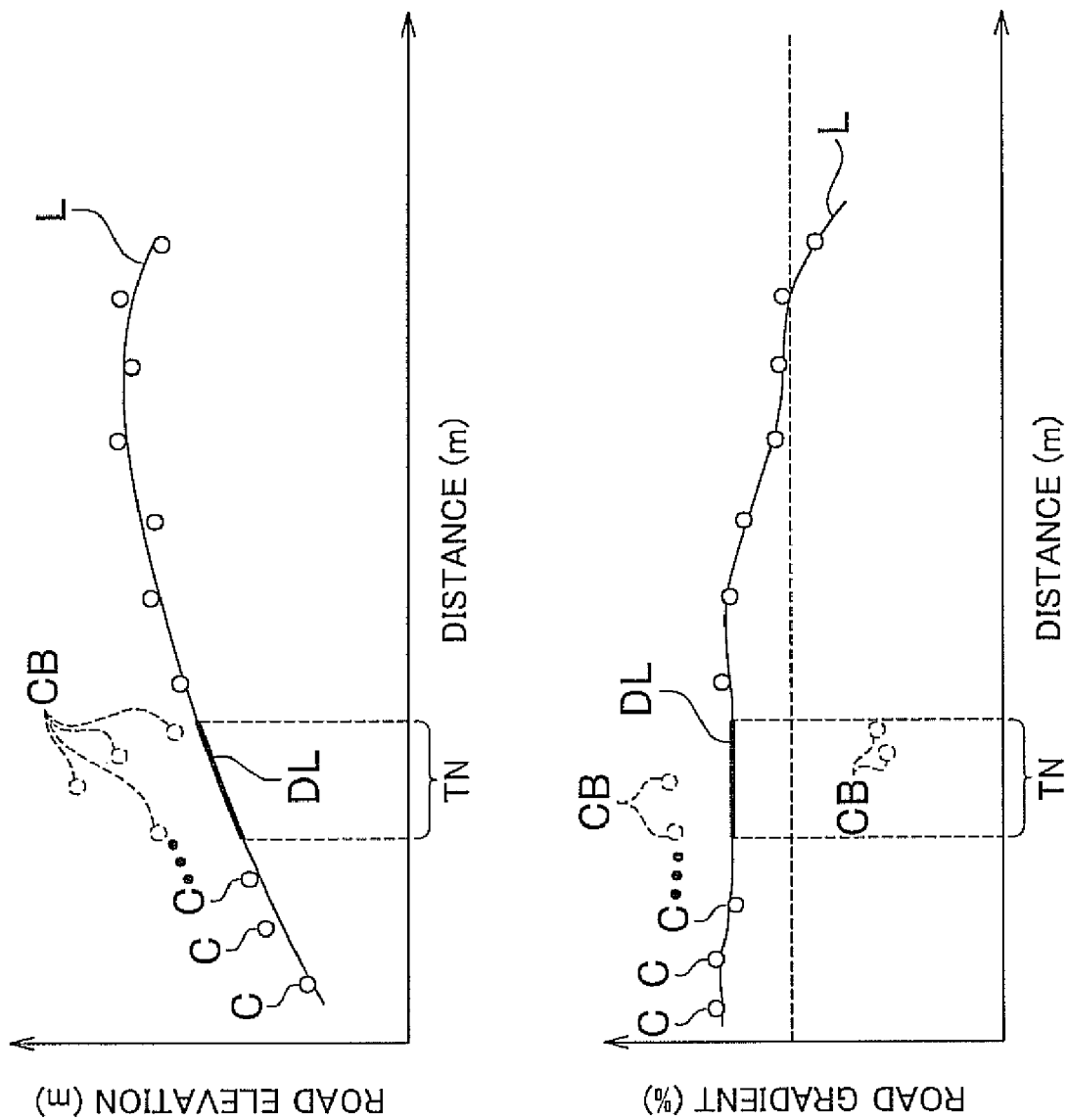
F I G . 9A
F I G . 9B

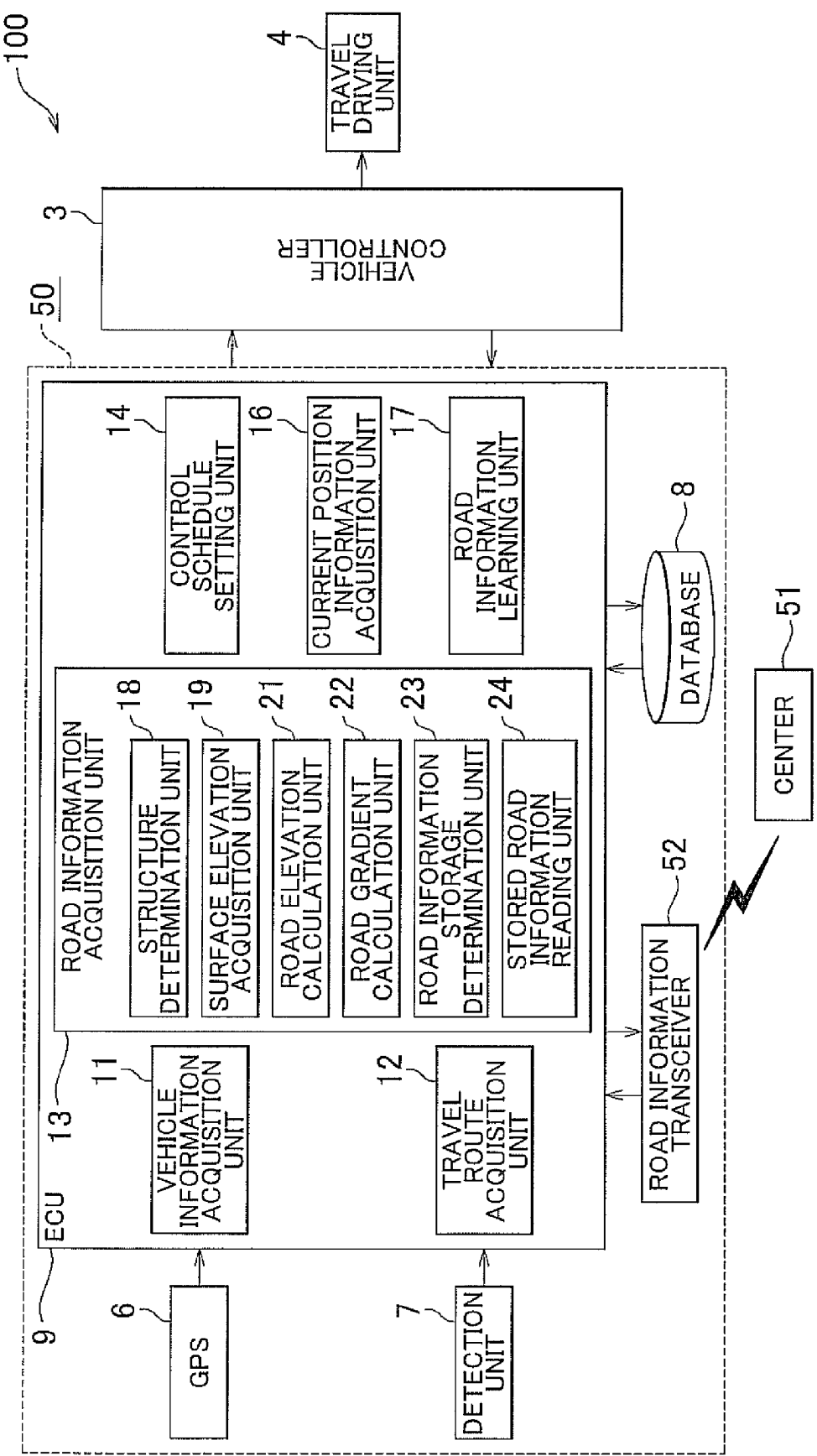

ROAD INFORMATION ACQUISITION DEVICE AND ROAD INFORMATION ACQUISITION METHOD

INCORPORATION BY REFERENCE

The disclosure of Japanese Patent Application No. 2008-280024 filed on Oct. 30, 2008, including the specification, drawings and abstract, is incorporated herein by reference in its entirety.

BACKGROUND OF THE INVENTION

1. Field of the Invention

The invention relates to a road information acquisition device and a road information acquisition method for obtaining road information such as a road elevation and a road gradient on a travel route of a vehicle.

2. Description of the Related Art

As described in Japanese Patent Application Publication No. 2004-37141 (JP-A-2004-37141), for example, a device for obtaining road information includes: road information storing means for storing the latitude/longitude of a plurality of points on a road; surface elevation storing means for storing surface elevation information relating to a plurality of points on a map; interpolated elevation value calculating means for calculating a road elevation value of the plurality of points on the road using the surface elevation data relating to the plurality of points on the map; and accuracy calculating means for calculating an accuracy of the calculated road elevation value from the road information or the surface elevation value information. By estimating the road elevation using this road information acquisition device, vehicle travel control enabling a reduction in fuel consumption, taking into account the road elevation and road gradient of the travel route, is performed.

SUMMARY OF THE INVENTION

On roads built on or in structures that do not follow the ground surface, such as tunnels, viaducts, bridges, embankments, and cuttings, there is a large difference between the surface elevation and the road elevation. Therefore, with the road information acquisition device described above, which calculates the road elevation on the basis of surface elevation information, it may be impossible to precisely obtain the road elevation in positions where such structures exist. Moreover, in the road information acquisition device described above, the road elevation in a position where a structure exists is not accuracy enough, and accordingly, the road elevation is estimated by performing filter processing to reduce the effect of the calculated road election or on the basis of the surface elevation at an entrance and an exit of the structure. However, the estimated road elevation is not accuracy enough to use during vehicle control, and as a result, inappropriate vehicle travel control that leads to an increase in fuel consumption and causes a driver to feel uncomfortable may be performed.

The invention has been designed to solve these problems, and an object thereof is to provide a road information acquisition device and a road information acquisition method with which road information relating to a travel route of a host vehicle can be obtained precisely.

A road information acquisition device according to the first aspect of the invention includes: a surface elevation acquisition unit that obtains a surface elevation; a road information acquisition unit that calculates first road information relating to a travel route to be traveled by a host vehicle on the basis of the surface elevation; and a structure determination unit that determines whether or not a structure exists on the travel route, wherein, when the structure determination unit determines that the structure exists on the travel route, the road information acquisition unit obtains second road information, which is different from the first road information, relating to a point at which the structure exists on the travel route.

When a road elevation and a road gradient of the travel route to be traveled by the host vehicle are obtained by the road information acquisition device, the first road information is calculated on the basis of the surface elevation in relation to normal roads, while the second road information, which is different from the first road information, is obtained in relation to roads determined to be built on or in a structure such as a tunnel, a viaduct, a bridge, an embankment, or a cutting. In other words, second road information that is not calculated on the basis of the surface elevation is obtained. Roads built on these structures do not follow the ground surface, and therefore there is a large difference between the surface elevation and the road elevation. Therefore, the first road information cannot be obtained accurately when calculated on the basis of the surface elevation. However, by interpolating roads built on these structures using second road information stored in a database or a center, for example, road information relating to the travel route of the host vehicle can be obtained precisely.

In the road information acquisition device according to the second aspect of the invention, the road information acquisition unit may obtain the second road information from a database provided in the host vehicle. When the second road information is obtained through external communication, the information cannot be obtained in cases where communication becomes impossible, but when the second road information is obtained from a database provided in the host vehicle, road information can be obtained reliably by obtaining the second road information from the database provided in the host vehicle.

In the road information acquisition device according to the third aspect of the invention, the road information acquisition unit may obtain the second road information from information storage unit existing outside of the host vehicle. Second road information learned by another vehicle, for example, may also be stored in the information storage unit existing on the outside of the host vehicle, and therefore newer information than information stored in an information storage medium provided in the host vehicle can be obtained.

In the road information acquisition device according to the fourth aspect of the invention, when the structure determination unit determines that the structure exists on the travel route, the road information acquisition unit need not calculate the first road information, relating to the point at which the structure exists on the travel route. In other words, the first road information is not calculated on the basis of the surface elevation even when second road information relating to a predetermined structure has not been stored in a database, a center, or the like in advance. Thus, inappropriate control caused by creating a control plan on the basis of inaccuracy road information can be prevented.

The road information acquisition device according to the fifth aspect of the invention may further include a road information learning unit that learns, as the host vehicle travels, the second road information relating to the travel route. The road information learning unit learn the second road information relating to the travel route, and the second road information can be stored in the database or the center in preparation for the next time the host vehicle travels along the same road. As a result, the road information can be obtained with an even higher degree of precision during a subsequent trip.

In the road information acquisition device according to the sixth aspect of the invention, the first and second road information may be a road elevation or a road gradient.

According to the aspects of the invention, a road elevation of a travel route traveled by a host vehicle can be obtained with a high degree of precision.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 8 is a diagram showing a relationship between a road elevation and a distance of a subject coordinate point and coordinate points existing before and after the subject coordinate point;

FIG. 9 is a diagram showing the relationship between the road elevation and the distance of a subject coordinate point and coordinate points existing before and after the subject coordinate point;

FIG. 10 is a block diagram showing a vehicle travel support apparatus including a road information acquisition device according to a second embodiment;

DETAILED DESCRIPTION OF EMBODIMENTS

Embodiments of a road information acquisition device according to the invention will be described in detail below with reference to the drawings.

Figure 1:
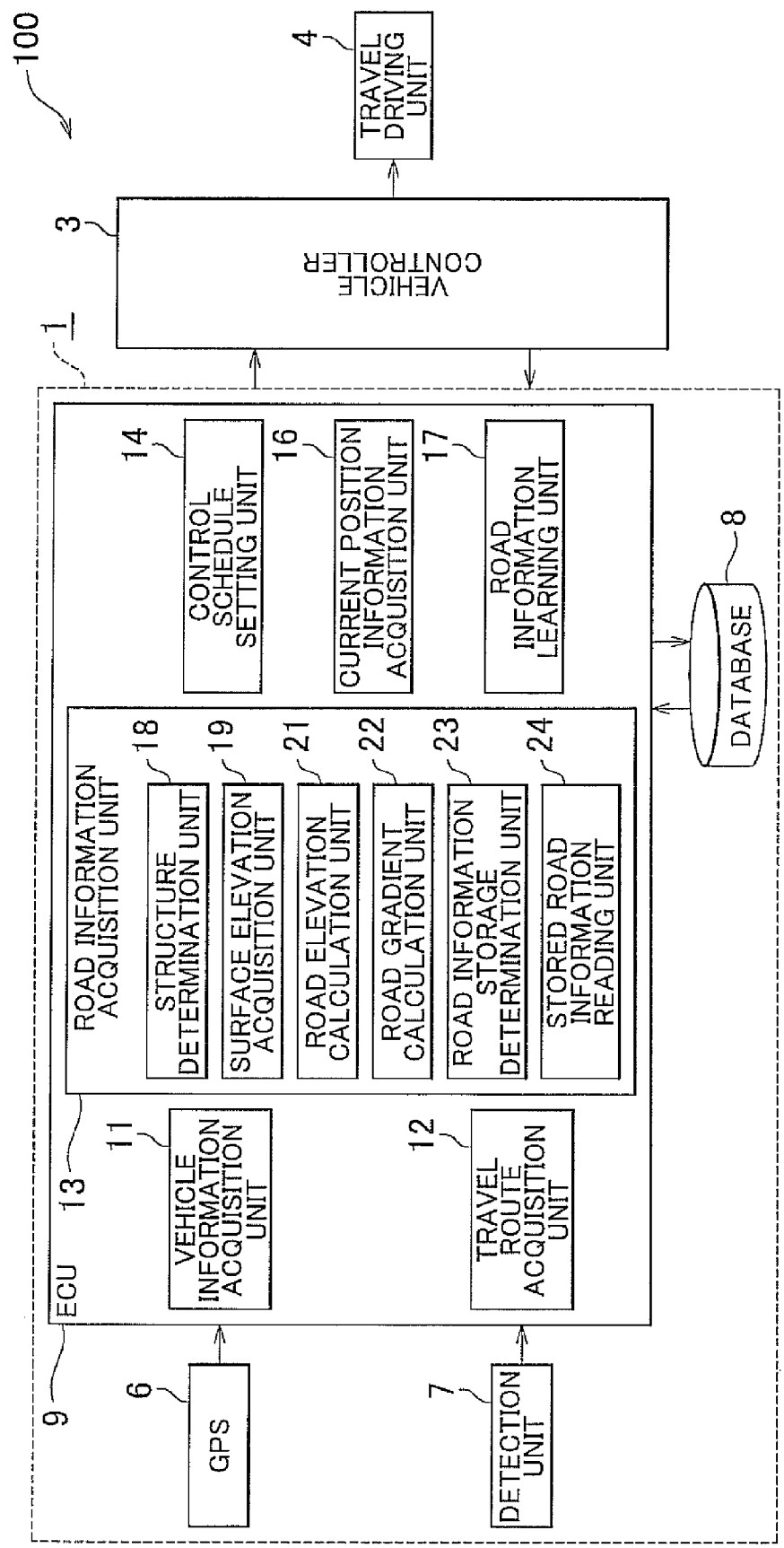
FIG. 1 is a block diagram showing a vehicle travel support apparatus including a road information acquisition device according to a first embodiment.

[First Embodiment] First, the constitution of a vehicle travel support apparatus 100 including a road information acquisition device 1 according to a first embodiment of the invention will be described. FIG. 1 is a block diagram showing the vehicle travel support apparatus 100 including the road information acquisition device 1 according to this embodiment. The vehicle travel support apparatus 100 obtains road information such as a road elevation and a road gradient relating to a planned travel route of a host vehicle, plans efficient travel control that reduces fuel consumption and travel control with which a battery of a hybrid electric automobile can be charged and discharged efficiently on the basis of the obtained road information, and controls vehicle travel in accordance with the plan. As shown in FIG. 1, the vehicle travel support apparatus 100 includes the road information acquisition device 1, a vehicle controller 3 (ECU), and a travel driving unit 4.

The vehicle controller 3 is an electronic control unit that performs control relating to travel of the host vehicle. The vehicle controller 3 includes a central processing unit (CPU), and includes a read only memory (ROM), a random access memory (RAM), an input signal circuit, an output signal circuit, a power supply circuit, and so on, for example. The vehicle controller 3 transmits a travel driving signal to the travel driving unit 4 on the basis of travel route information and control schedule information received from the road information acquisition device 1. Further, the vehicle controller 3 transmits information relating to a battery state of charge and information relating to an HV/EV travel mode of the host vehicle to the road information acquisition device 1.

The travel driving unit 4 performs travel-driving on the vehicle, and is constituted by a throttle motor and an injector, a motor for a hybrid electric automobile, and so on, for example. The travel driving unit 4 is activated upon reception of the travel driving signal from the vehicle controller 3, and executes vehicle travel driving corresponding to the travel driving signal.

The road information acquisition device 1 sets a travel route to be traveled by the host vehicle on the basis of current position information relating to the host vehicle and destination information input by a driver, and sets an optimum control schedule for the host vehicle by obtaining road information such as a road elevation and a road gradient of the set travel route. The road information acquisition device 1 includes a global positioning system (GPS) 6, a detection unit 7, a database 8, and an electronic control unit (ECU) 9.

The GPS 6 obtains position information relating to a current travel position of the host vehicle and information relating to a travel direction of the host vehicle, and is constituted by a GPS receiver that receives radio waves transmitted from a satellite, for example. The GPS 6 outputs the obtained position information to the ECU 9.

The detection unit 7 detects various information required to calculate the road elevation and road gradient of a road along which the host vehicle is traveling. The detection unit 7 includes various sensors such as an air pressure sensor that detects an air pressure in order to calculate the road elevation, an incline sensor that detects an incline in order to calculate the road gradient, and an acceleration sensor that detects acceleration, for example. The detection unit 7 outputs the various detected information to the ECU 9.

The database 8 stores various information required to obtain the road information. The database 8 includes an information storage medium such as a hard disk drive (HDD) or a digital versatile disc-read only memory (DVD-ROM) built into the device, for example. More specifically, the database 8 stores a road classification, a number of lanes, a road radius of curvature, information relating to the presence of intersections, tunnels, bridges, viaducts, railway crossings, toll gates, embankments, and so on, restriction information such as speed limits, area information indicating urban roads, mountain roads, and so on, surface elevation mesh data relating to a map of Japan, and so on. Here, mesh elevation data provided by the Japanese Geographical Survey Institute, for example, are used as the surface elevation mesh data. The mesh elevation data are created by dividing a map of the whole of Japan into small square regions of approximately 50 m per side and storing the elevation at the center of each region. The database 8 also stores second road information such as road elevation data and road gradient data relating to roads on the map. The information stored in the database 8 can be read at a required timing and updated with new information, and new information can be stored additionally in the database 8. Here, first road information denotes road information obtained by performing calculations on the basis of the surface elevation. The second road information differs from the first road information in that it is not obtained by performing calculations on the basis of the surface elevation, and includes road information data collected by a probe car or the like and road information data learned in the past when the host vehicle traveled over a road built on a structure.

The ECU 9 is an electronic control unit that controls the road information acquisition device 1. The ECU 9 is mainly constituted by a CPU, and includes a ROM, a RAM, an input signal circuit, an output signal circuit, a power supply circuit, and so on, for example. The ECU 9 includes a vehicle information acquisition unit 11, a travel route acquisition unit 12, a road information acquisition unit (a road information acquisition unit) 13, a control schedule setting unit 14, a current position information acquisition unit 16, and a road information learning unit (a road information learning unit) 17.

The vehicle information acquisition unit 11 obtains information relating to the host vehicle input from the vehicle controller 3. More specifically, the vehicle information acquisition unit 11 obtains information such as the speed and acceleration of the host vehicle, information relating to the battery state of charge, and information relating to the HV/EV travel mode of the host vehicle. The vehicle information acquisition unit 11 outputs the obtained vehicle information to the travel route acquisition unit 12 and the control schedule setting unit 14.

The travel route acquisition unit 12 obtains a set travel route to be traveled by the host vehicle or a travel route determined through estimation. Specifically, the travel route acquisition unit 12 calculates a travel route to be traveled by the host vehicle on the basis of position information relating to the current travel position of the host vehicle, input from the GPS 6, and a destination. The destination may be obtained through an operation of a touch panel provided in the vehicle, which is performed by the driver. The travel route acquisition unit 12 displays the obtained travel route on a display provided in the vehicle and outputs the obtained travel route to the control schedule setting unit 14.

The control schedule setting unit 14 sets an optimum control schedule to be executed during travel along the travel route. The control schedule setting unit 14 sets the control schedule by planning efficient travel control that reduces fuel consumption and travel control with which the battery of the hybrid electric automobile can be charged and discharged efficiently on the basis of the road elevation and road gradient of the travel route. The control schedule setting unit 14 outputs the set control schedule to the vehicle controller 3.

The current position information acquisition unit 16 obtains current position information indicating the position of the host vehicle on the travel route as the host vehicle travels along the travel route. On the basis of the position information input from the GPS 6, the current position information acquisition unit 16 specifies on a map the current position of the host vehicle on the set travel route. The current position information acquisition unit 16 outputs the obtained current position information to the vehicle controller 3.

The road information learning unit 17 obtains and learns second road information relating to a traveled road as the host vehicle travels along the travel route. Specifically, the road information learning unit 17 obtains the road elevation of the traveled road on the basis of air pressure information input from the air pressure sensor of the detection unit 7 and the information input from the GPS 6, and calculates and learns the road gradient of the traveled road on the basis of information input from the incline sensor and acceleration sensor of the detection unit 7. Further, when the host vehicle is traveling along a road for which second road information is not stored in the database 8, the road information learning unit 17 outputs second road information relating to this road to the database 8 to be stored therein. When the second road information has already been stored, on the other hand, the road information learning unit 17 updates the second road information stored in the database 8 with the newest data. In this embodiment, the road information learning unit 17 learns second road information relating in particular to roads built on or in structures that do not follow the ground surface, such as tunnels, viaducts, bridges, embankments, and cuttings.

The road information acquisition unit 13 obtains road information such as the road elevation and road gradient on the planned travel route to be traveled by the host vehicle. Specifically, the road information acquisition unit 13 calculates the first road information relating to normal roads of the travel route that follow the ground surface on the basis of the surface elevation of the surface elevation mesh data, and obtains the second road information relating to roads built on or in structures that do not follow the ground surface by reading the second road information stored in the database. The road information acquisition unit 13 outputs the obtained road information to the control schedule setting unit 14. Further, the road information acquisition unit 13 includes a structure determination unit (a structure determining unit) 18, a surface elevation acquisition unit (a surface elevation acquisition unit) 19, a road elevation calculation unit 21, a road gradient calculation unit 22, a road information storage determination unit 23, and a stored road information reading unit 24.

The structure determination unit 18 determines whether or not a structure exists on the planned travel route to be traveled by the host vehicle. On the basis of the information stored in the database 8, the structure determination unit 18 determines whether or not a structure such as a tunnel, a viaduct, a bridge, an embankment, or a cutting exists on the travel route. The structure determination unit 18 outputs the determination result to the road elevation calculation unit 21, the road gradient calculation unit 22, and the road information storage determination unit 23.

The surface elevation acquisition unit 19 obtains surface elevation information relating to the travel route from the surface elevation mesh data stored in the database 8. The surface elevation acquisition unit 19 outputs the obtained surface elevation information to the road elevation calculation unit 21.

The road elevation calculation unit 21 calculates the road elevation at each coordinate point of the planned travel route to be traveled by the host vehicle on the basis of the surface elevation information input from the surface elevation acquisition unit 19. The road elevation calculation unit 21 calculates the road elevation in relation to coordinate points of the travel route at which no structure has been determined to exist by the structure determination unit 18, but does not calculate the road elevation in relation to coordinate points at which a structure has been determined to exist. The road elevation calculation unit 21 outputs the calculated road elevation to the road gradient calculation unit 22 and the control schedule setting unit 14.

The road gradient calculation unit 22 calculates the road gradient at each coordinate point of the planned travel route to be traveled by the host vehicle on the basis of the road elevation input from the road elevation calculation unit 21. The road gradient calculation unit 22 calculates the road gradient in relation to coordinate points of the travel route at which no structure has been determined to exist by the structure determination unit 18, but does not calculate the road gradient in relation to coordinate points at which a structure has been determined to exist. The road gradient calculation unit 22 outputs the calculated road gradient to the control schedule setting unit 14.

The road information storage determination unit 23 determines whether or not data relating to the road elevation and road gradient of a coordinate point at which a structure exists on the planned travel route to be traveled by the host vehicle are stored in the database 8. The road information storage determination unit 23 determines whether or not data relating to coordinate points at which a structure has been determined to exist by the surface elevation acquisition unit 19 have been stored. The road information storage determination unit 23 outputs the determination result to the stored road information reading unit 24.

The stored road information reading unit 24 reads the data relating to the road elevation and road gradient of the coordinate point at which a structure exists on the planned travel route to be traveled by the host vehicle from the database 8. The stored road information reading unit 24 reads the data relating to the coordinate points at which a structure has been determined to exist by the surface elevation acquisition unit 19 when the road information storage determination unit 23 determines that the data have been stored in the database 8.

Figure 2:
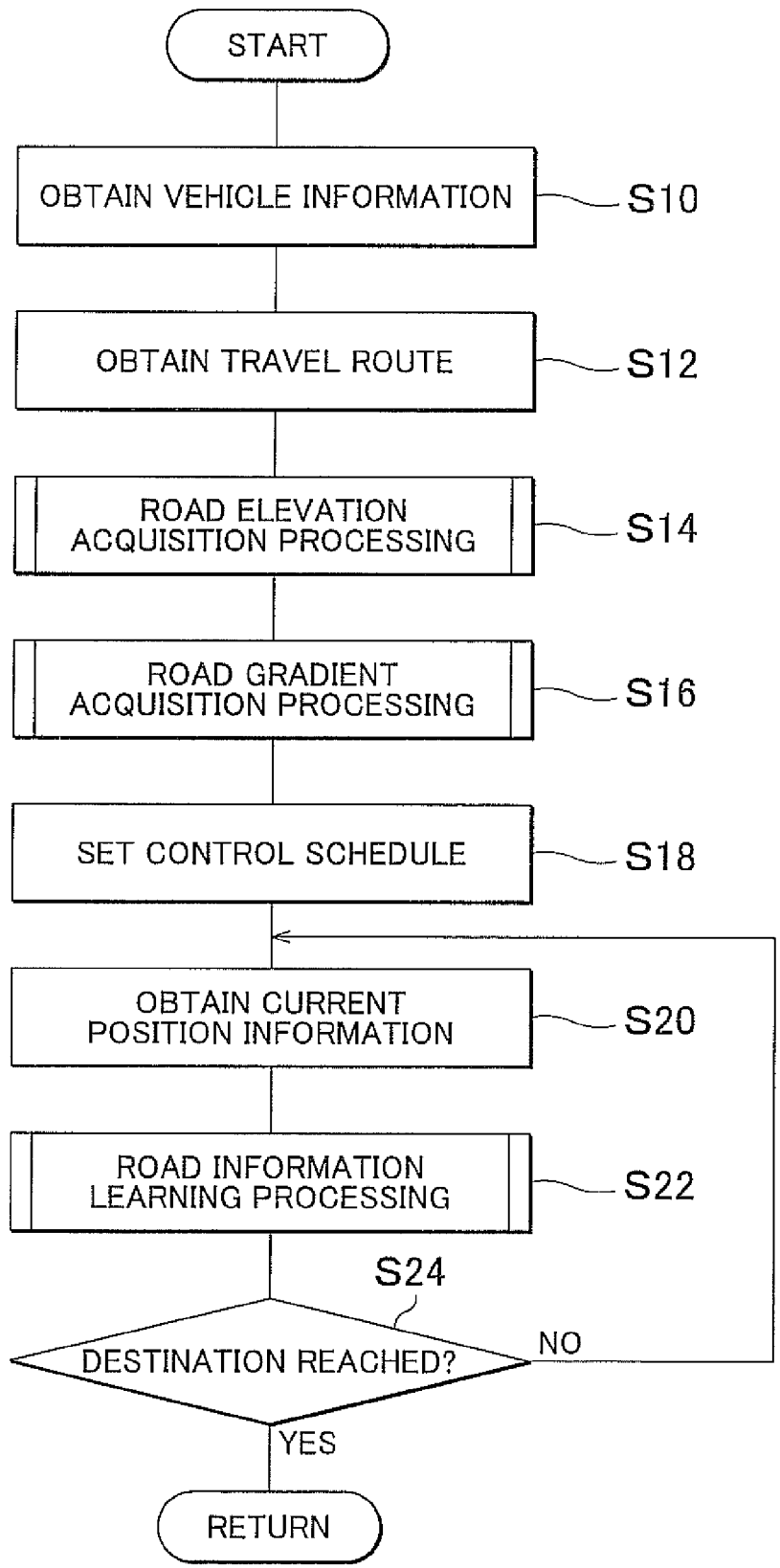
FIG. 2 is a flowchart showing driving support processing executed by the road information acquisition device according to the first embodiment.
Figure 3:
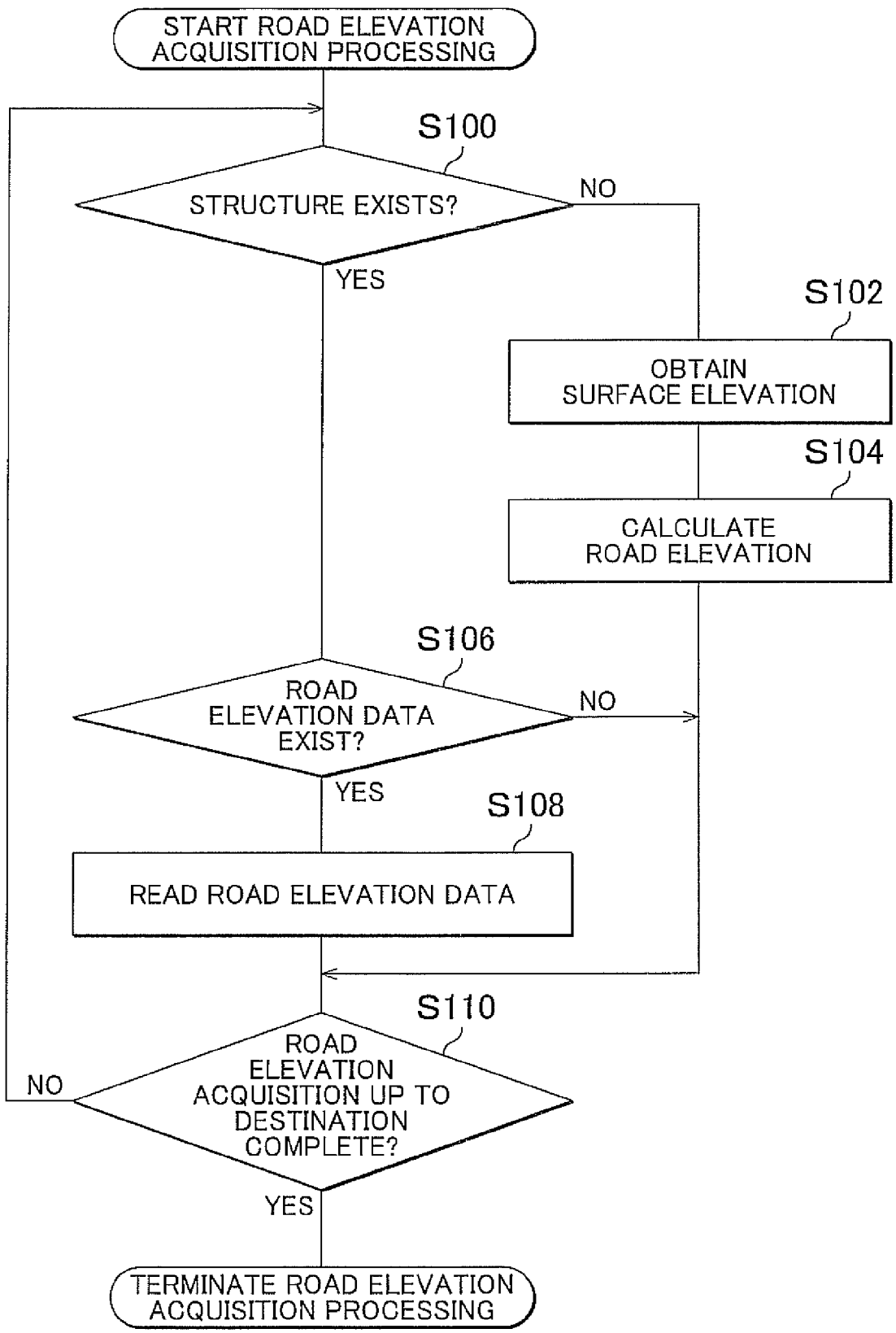
FIG. 3 is a flowchart showing road elevation acquisition processing included in road information acquisition processing executed by the road information acquisition device according to the first embodiment.
Figure 4:
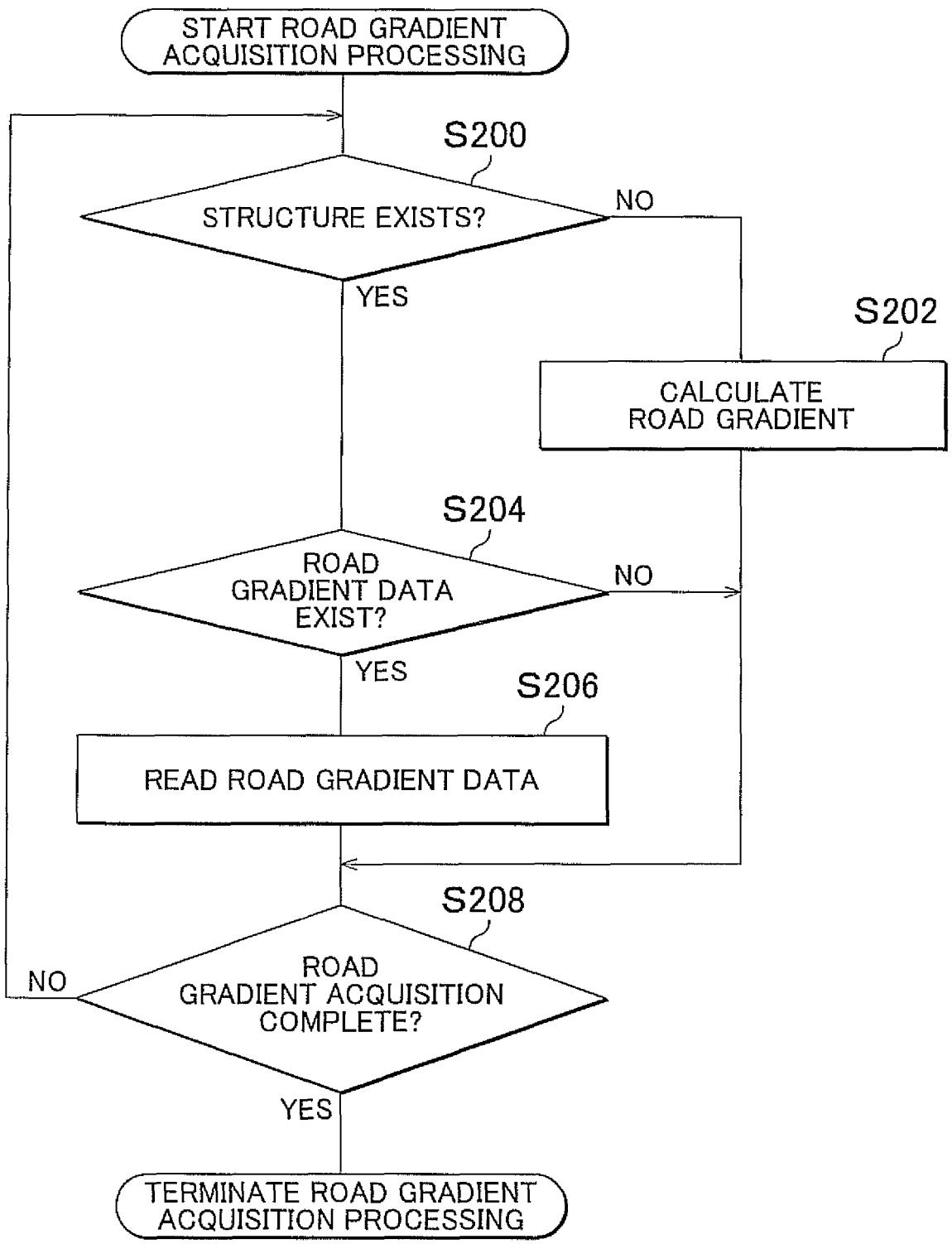
FIG. 4 is a flowchart showing road gradient acquisition processing included in the road information acquisition processing executed by the road information acquisition device according to the first embodiment.
Figure 5:
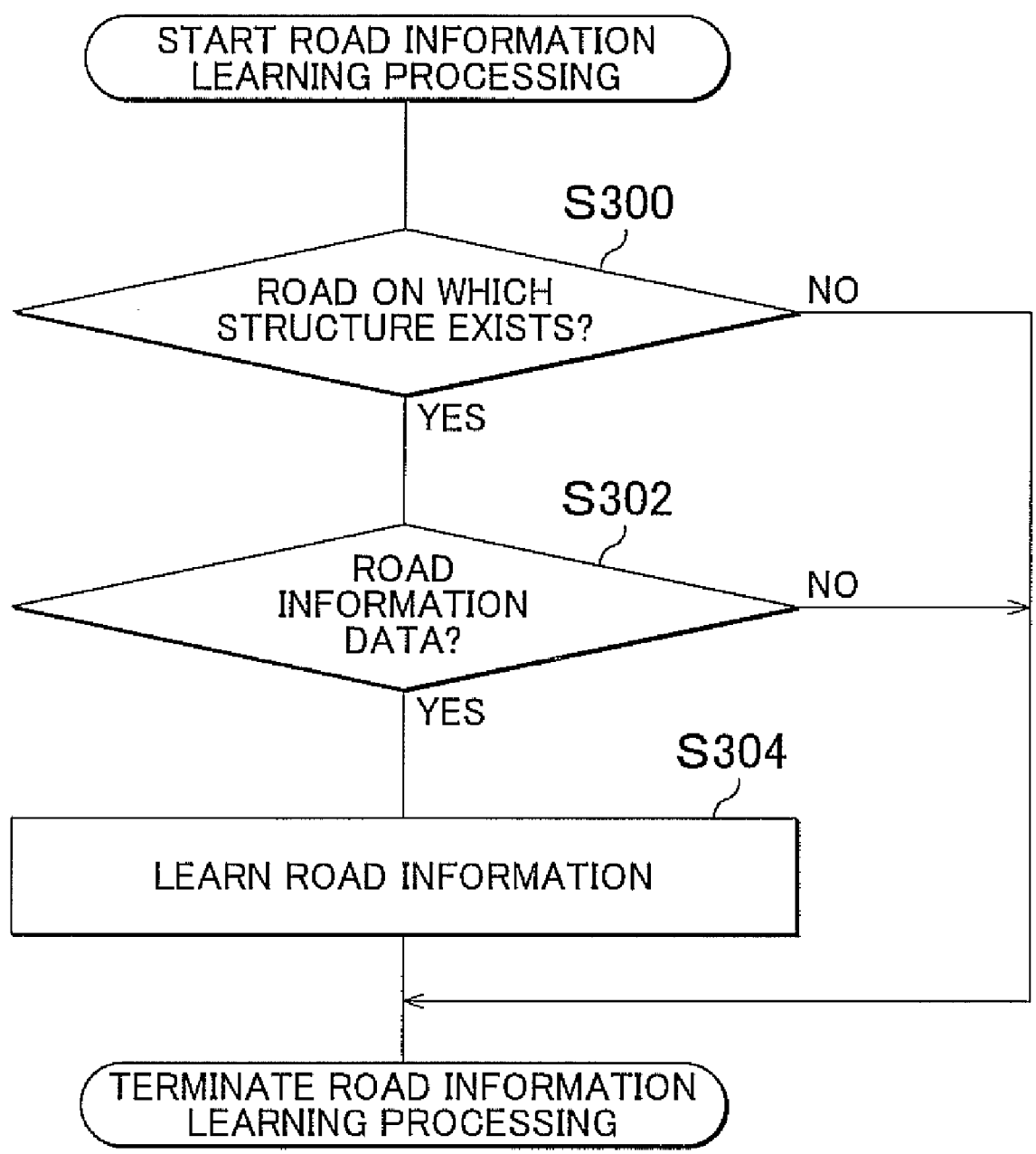
FIG. 5 is a flowchart showing road information learning processing executed by the road information acquisition device according to the first embodiment.

Next, referring to FIGS. 2 to 5, an operation of the road information acquisition device 1 according to this embodiment will be described. FIG. 2 is a flowchart showing driving support processing executed by the road information acquisition unit 1 according to this embodiment. FIG. 3 is a flowchart showing road elevation acquisition processing included in road information acquisition processing executed by the road information acquisition device 1 according to this embodiment. FIG. 4 is a flowchart showing road gradient acquisition processing included in the road information acquisition processing executed by the road information acquisition device 1 according to this embodiment. FIG. 5 is a flowchart showing road information learning processing according to this embodiment.

In this embodiment, processing executed in a case where the host vehicle is set in an HV travel mode and travel is performed after setting a destination on a setting screen of a car navigation system at a departure point will be described. This processing is executed in the ECU 9 from departure after setting of the destination to arrival at the destination. Note that processing from S10 to S18 in FIG. 2 is performed immediately after setting the destination at the time of departure, while processing from S20 to S24 is performed as the host vehicle travels along the set travel route.

As shown in FIG. 2, the road information acquisition device 1 begins with vehicle information acquisition processing (S10). The processing of S10 is executed by the vehicle information acquisition unit 11 to obtain information such as the speed and acceleration of the host vehicle, information relating to the battery state of charge, and information relating to the travel mode of the host vehicle. When the processing of S10 ends, the routine proceeds to travel route acquisition processing (S12).

Figure 6:
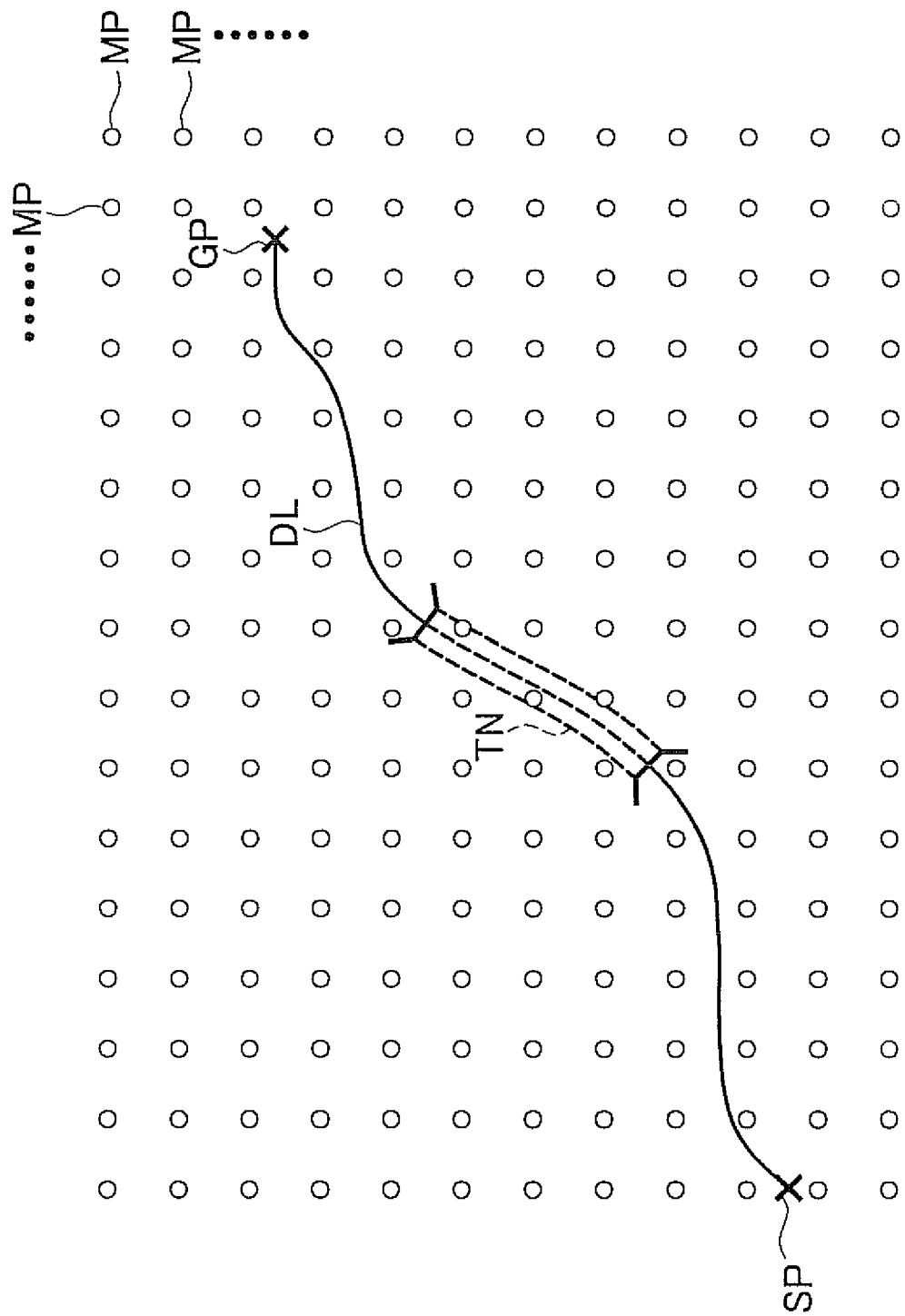
FIG. 6 is a view showing an example of a travel route set on surface elevation mesh data.

The processing of S12 is executed by the travel route acquisition unit 12 to calculate a travel route to be traveled by the host vehicle on the basis of position information relating to the departure point of the host vehicle, which is input from the GPS 6, and the destination set by the driver. Specifically, as shown in FIG. 6, a travel route DL is set between a departure point SP and a destination GP. When the processing of S12 ends, the routine proceeds to road elevation acquisition processing (S14). When the processing of S14 ends, the routine proceeds to road gradient acquisition processing (S16).

The processing of S14 and S16 is executed by the road information acquisition unit 13 to obtain road information such as the road elevation and road gradient of the travel route obtained in S12. The road elevation acquisition processing and road gradient acquisition processing will now be described in detail with reference to FIGS. 3 and 4. The road elevation acquisition processing and road gradient acquisition processing are performed on all coordinate points existing between a coordinate point of a departure position of the travel route obtained in S12 and a coordinate point of the destination such that the processing starts with road information acquisition in relation to the coordinate point of the departure position and ends with road information acquisition in relation to the coordinate point of the destination.

As shown in FIG. 3, the road information acquisition unit 13 begins the road elevation acquisition processing from structure determination processing (S100). The processing of S100 is executed by the structure determination unit 18 to determine whether or not a structure exists on the travel route obtained in S12. In FIG. 6, for example, it is determined that a structure exists in positions passing through a tunnel TN on the travel route DL. When it is determined in S100 that a structure does not exist at a subject coordinate point, the routine proceeds to surface elevation acquisition processing (S102).

The processing of S102 is executed by the surface elevation acquisition unit 19 to obtain surface elevation information relating to the travel route from the surface elevation mesh data stored in the database 8. In FIG. 6, mesh positions are denoted by MP. When the processing of S102 ends, the routine proceeds to road elevation calculation processing (S104).

Figure 7:
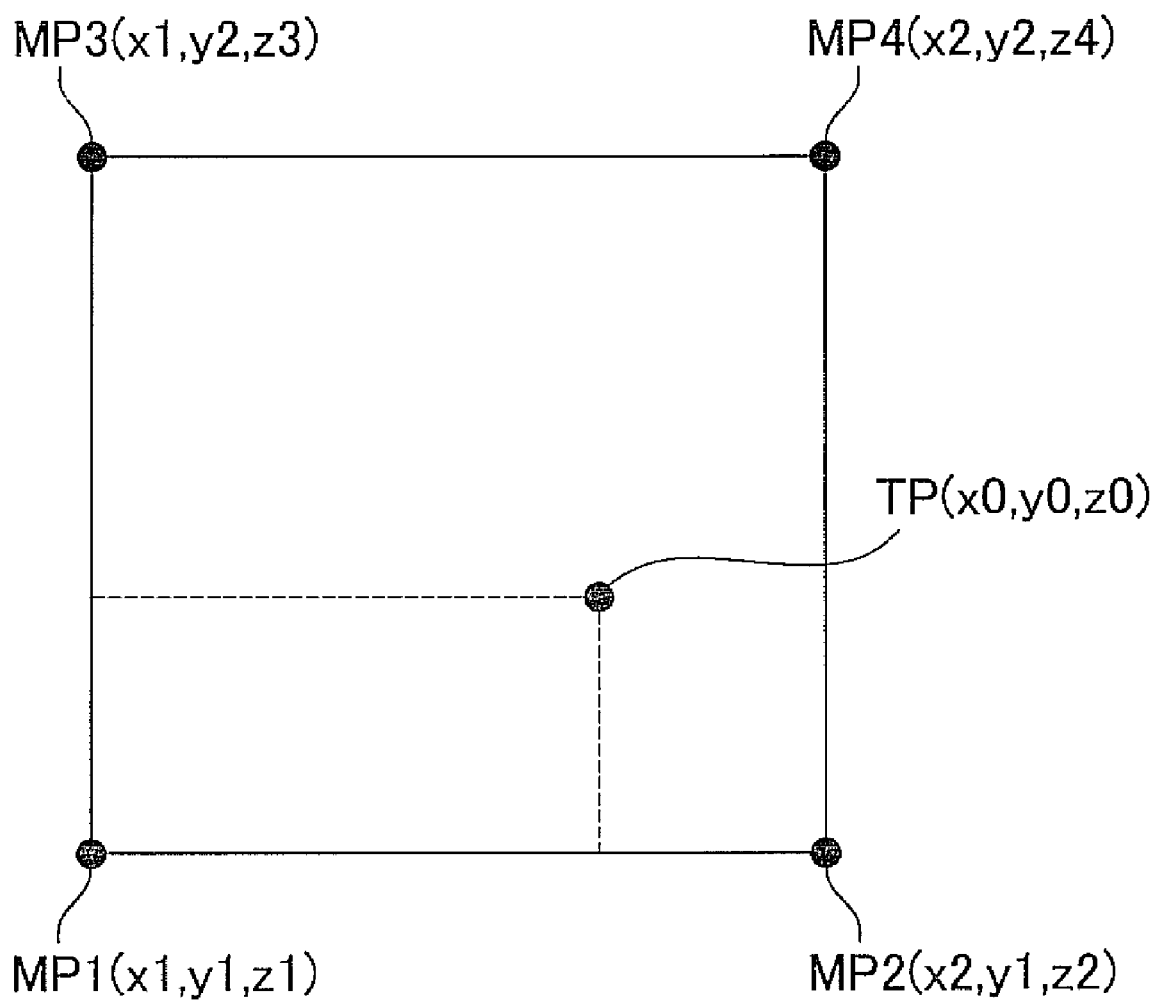
FIG. 7 is a view illustrating a road elevation calculation method.

The processing of S104 is executed by the road elevation calculation unit 21 to calculate the road elevation at the subject coordinate point on the basis of the surface elevation information obtained in S102. The road elevation is calculated on the basis of the surface elevation information using a bilinear method. The road elevation calculation processing will now be described with reference to FIG. 7. FIG. 7 is a view showing a subject coordinate point TP at which the road elevation is to be calculated and mesh positions MP1 to MP4 on the surface elevation mesh data. As shown in FIG. 7, when coordinates of the subject coordinate point TP are set at ($x0$, $y0$, $z0$), coordinates of the mesh position MP1 are set at ($x1$, $y1$, $z1$), coordinates of the mesh position MP2 are set at ($x2$, $y1$, $z2$), coordinates of the mesh position MP3 are set at ($x1$, $y2$, $z3$), and coordinates of the mesh position MP4 are set at ($x2$, $y2$, $z4$), the road elevation of the subject coordinate point TP, or in other words $z0$, is calculated using the following Equations (1) to (3). When the processing of S104 ends, the routine proceeds to acquisition completion determination processing (S110). Note that the road gradient is not calculated in positions where a structure exists.

[E1]

$$A=((x0-x1)/(x2-x1))\times z2+(1-(x0-x1)/(x2-x1))\times z1 \quad (1)$$

$$B=((x0-x1)/(x2-x1))\times z4+(1-(x0-x1)/(x2-x1))\times z3 \quad (2)$$

$$z0=((y0-y1)/(y2-y1))\times B+(1-(y0-y1)/(y2-y1))\times A \quad (3)$$

When it is determined in S100 that a structure exists at the subject coordinate point, on the other hand, the routine proceeds to road elevation storage determination processing (S106). The processing of S106 is executed by the road information storage determination unit 23 to determine whether or not road elevation data relating to the coordinate point at which the structure was determined to exist in S100 are stored in the database 8. When it is determined in S106 that the road elevation data do not exist, the routine proceeds to the acquisition completion determination processing (S110) without performing road elevation acquisition. When it is determined in S106 that the road elevation data exist, on the other hand, the routine proceeds to road elevation data reading processing (S108).

The processing of S108 is executed by the stored road information reading unit 24 to read the road elevation data relating to the subject coordinate point at which the structure was determined to exist in S100 from the database 8. When the processing of S108 ends, the routine proceeds to the acquisition completion determination processing (S110).

The processing of S110 is executed by the road information acquisition unit 13 to determine whether or not the subject coordinate point has reached the destination. When it is determined in S110 that the subject coordinate point has reached the destination, the processing of FIG. 3 is terminated, assuming that the road elevation of all of the coordinate points on the travel route, excluding the coordinate points of the structure, has been obtained. When it is determined in S110 that the subject coordinate point has not reached the destination, on the other hand, the next coordinate point on the travel route is set as the subject coordinate point, whereupon the routine returns to the processing of S100.

As shown in FIG. 4, the road information acquisition unit 13 starts the road gradient acquisition processing from structure determination processing (S200). The processing of S200 is executed by the structure determination unit 18 to determine whether or not a structure exists on the travel route obtained in S12. When it is determined in S200 that a structure does not exist at the subject coordinate point, the routine proceeds to road gradient calculation processing (S202).

The processing of S202 is executed by the road gradient calculation unit 22 to calculate the road gradient at the subject coordinate point on the basis of the road elevation obtained by the road elevation acquisition processing of S14. A road gradient calculation performed in the road gradient calculation processing will now be described specifically with reference to FIG. 8. FIG. 8 is a diagram showing a relationship between a road elevation and a distance of a subject coordinate point and coordinate points existing before and after the subject coordinate point. In FIG. 8, road elevations at coordinate points P obtained in S14 are plotted. As shown in FIG. 8, first, a gradient virtual distance VL is set, whereupon virtual points VP1 and VP2 are set in positions distanced from the subject coordinate point TP in a front and back direction by VL/2. The virtual points VP1, VP2 may be calculated through linear interpolation. Next, an elevation difference ΔH between the virtual point VP1 and the virtual point VP2 is calculated. Hence, the road gradient of the subject coordinate point TP can be calculated by [elevation difference ΔH (m)/gradient virtual distance VL]×100 (%). Note that the road gradient is not calculated in positions where a structure exists.

When it is determined in S200 that a structure exists at the subject coordinate point, on the other hand, the routine proceeds to road gradient storage determination processing (S204). The processing of S204 is executed by the road information storage determination unit 23 to determine whether or not road gradient data relating to the coordinate point at which the structure was determined to exist in S200 are stored in the database 8. When it is determined in S204 that the road gradient data do not exist, the routine proceeds to acquisition completion determination processing (S208) without performing road gradient acquisition. When it is determined in S204 that the road gradient data exist, on the other hand, the routine proceeds to road gradient data reading processing (S206).

The processing of S206 is executed by the stored road information reading unit 24 to read the road gradient data relating to the subject coordinate point at which the structure was determined to exist in S200 from the database 8. When the processing of S206 ends, the routine proceeds to the acquisition completion determination processing (S208).

The processing of S208 is executed by the road information acquisition unit 13 to determine whether or not the subject coordinate point has reached the destination. When it is determined in S208 that the subject coordinate point has reached the destination, the processing of FIG. 4 ends, assuming that the road gradient of all of the coordinate points on the travel route, excluding the coordinate points of the structure, has been obtained. When it is determined in S208 that the subject coordinate point has not reached the destination, on the other hand, the next coordinate point on the travel route is set as the subject coordinate point, whereupon the routine returns to the processing of S200.

When the processing described above is complete, the routine returns to FIG. 2, completes the processing of S16, and then proceeds to control schedule setting processing (S18). The processing of S18 is executed by the control schedule setting unit 14 to set an optimum control schedule to be implemented during travel along the travel route set in S12. Specifically, a control schedule is set in S18 by planning travel control with which the battery of the hybrid electric automobile can be charged and discharged efficiently on the basis of the road elevation obtained in S14 and the road gradient obtained in S16. Once the control schedule has been set in S18, the control schedule is output to the vehicle controller 3. When the processing of S18 ends, the routine proceeds to current position information acquisition processing (S20). Note that the processing of S20 is executed once the host vehicle has begun to travel.

The processing of S20 is executed by the current position information acquisition unit 16 as the host vehicle travels along the travel route to obtain current position information indicating the travel position of the host vehicle on the travel route. Once the current position information has been obtained in S20, the current position information is output to the vehicle controller 3. The vehicle controller 3 into which the current position information is input compares the control schedule input in S18 with the current position information, and performs travel control in accordance with the control schedule. When the processing of S20 ends, the routine proceeds to road information learning processing (S22).

The processing of S22 is executed by the road information learning unit 17 to obtain and learn the road elevation and road gradient of the traveled road as the host vehicle travels along the travel route. The road information learning processing will now be described in detail with reference to FIG. 5.

As shown in FIG. 5, the road information learning processing starts from structure determination processing (S300). The processing of S300 is performed to determine whether or not the current travel position of the host vehicle corresponds to a road built on a structure. When it is determined in S300 that the current position does not correspond to a road built on a structure, the processing of FIG. 5 is terminated. When it is determined in S300 that the current position corresponds to a road built on a structure, on the other hand, the routine proceeds to road information storage determination processing (S302).

The processing of S302 is performed to determine whether or not road elevation data or road gradient data relating to, the current position of the host vehicle are stored in the database 8. When it is determined in S302 that the road elevation data and road gradient data are stored in the database 8, the processing of FIG. 5 is terminated. When it is determined in S302 that one or both of the road elevation data and the road gradient data are not stored in the database 8, on the other hand, the routine proceeds to road information learning processing (S304).

The processing of S304 is performed to learn the road elevation and road gradient of the road on which the vehicle currently travels, and to output the learned road elevation and road gradient to the database 8 to be stored as road information data. When the processing of S304 is complete, the processing of FIG. 5 is terminated.

Returning to FIG. 2, when the processing of S22 is complete, the routine advances to destination arrival determination processing (S24). The processing of S24 is performed to determine whether or not the host vehicle has arrived at the destination. Specifically, the current position obtained in S20 is compared with the destination, and when the current position of the vehicle matches the destination, it is determined that the host vehicle has arrived at the destination. When the current position of the vehicle does not match the destination, it is determined that the host vehicle has not yet arrived at the destination. When it is determined in S24 that the host vehicle has not yet arrived at the destination, the routine returns to the current position information acquisition processing (S20), in which the host vehicle is caused to follow the control schedule and travel while learning the second road information. When it is determined in S24 that the host vehicle has arrived at the destination, on the other hand, the processing of FIG. 2 is terminated.

By performing the processing described above, a road elevation and a road gradient such as those shown in FIG. 9, for example, can be obtained. FIG. 9A is a diagram showing a relationship between the road elevation of each obtained coordinate point and the distance between each coordinate point on the travel route. FIG. 9B is a diagram showing a relationship between the road gradient of each obtained coordinate point and the distance between each coordinate point on the travel route. In FIGS. 9A and 9B, the actual road elevation and road gradient are indicated by solid lines L. Road elevations and road gradients obtained through calculation from the surface elevation are indicated by points C, and road elevations and road gradients obtained from the database 8 are indicated by thick lines DL. In the section TN where the structure exists, the calculated road elevation and road gradient deviate greatly from the actual road elevation and road gradient, as shown by points CB depicted by dotted lines. Hence, when the control schedule is set using road elevations and road gradients calculated in relation to all sections of the travel route, appropriate control cannot be executed, and inefficient and inappropriate control may be executed instead. This inappropriate control may be performed even when a fixed coefficient is applied to the first road information of the section TN to reduce the effect thereof. However, when the road elevations and road gradients obtained from the database 8 are used in only the section TN where the structure exists, an appropriate control schedule can be set.

As described above, with the road information acquisition device 1 according to this embodiment, the road elevation and road gradient of the travel route to be traveled by the host vehicle are obtained by calculating the road elevation and road gradient of a normal road on the basis of the surface elevation and obtaining the second road information stored in advance in the database 8 in relation to a road determined to be built on or in a structure such as a tunnel, a viaduct, a bridge, an embankment, or a cutting. Since these structures do not follow the ground surface, there is a large difference between the surface elevation and the road elevation such that accurate first road information cannot be obtained when calculated on the basis of the surface elevation. However, by interpolating roads built on these structures using the pre-stored second road information, road information relating to the travel route of the host vehicle can be obtained with a high degree of precision.

Further, in the road information acquisition device 1 according to this embodiment, the road elevation calculation unit 21 and road gradient calculation unit 22 do not calculate the first road information when the structure determination unit 18 determines the existence of a structure. In other words, the first road information is not calculated on the basis of the surface elevation even when second road information relating to a predetermined structure has not been stored in the database 8 in advance. Thus, inappropriate control caused by creating a control plan on the basis of inaccuracy road information can be prevented.

Further, in the road information acquisition device 1 according to this embodiment, the road information learning unit 17 is provided to learn the second road information relating to the traveled road as the host vehicle travels, and therefore the second road information can be stored in preparation for the next time the host vehicle travels along the same road. Thus, the road information can be obtained with an even higher degree of precision during a subsequent trip.

[Second Embodiment] As shown in FIG. 10, a road information acquisition device 50 according to a second embodiment differs from the road information acquisition device 1 according to the first embodiment in that the second road information can be read not only from the database 8, but also from a center (information storing means) 51 in which the second road information is stored in advance. More specifically, the road information acquisition device 50 includes, in addition to the database 8, a road information transceiver 52 capable of obtaining the second road information by receiving a signal from the center 51, which is disposed on the exterior of the host vehicle.

Figure 11:
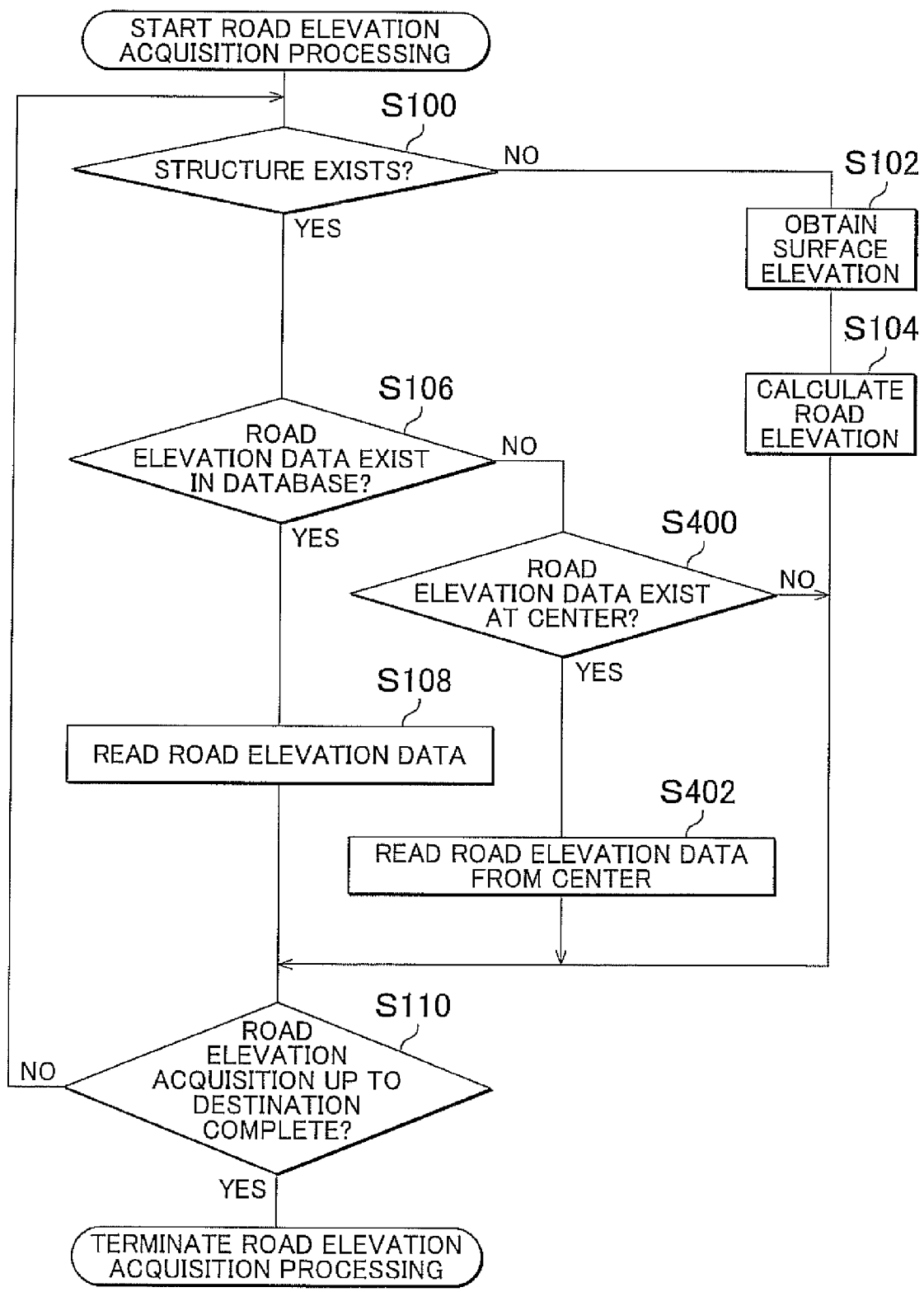
FIG. 11 is a flowchart showing road elevation acquisition processing included in road information acquisition processing executed by the road information acquisition device according to the second embodiment.
Figure 12:
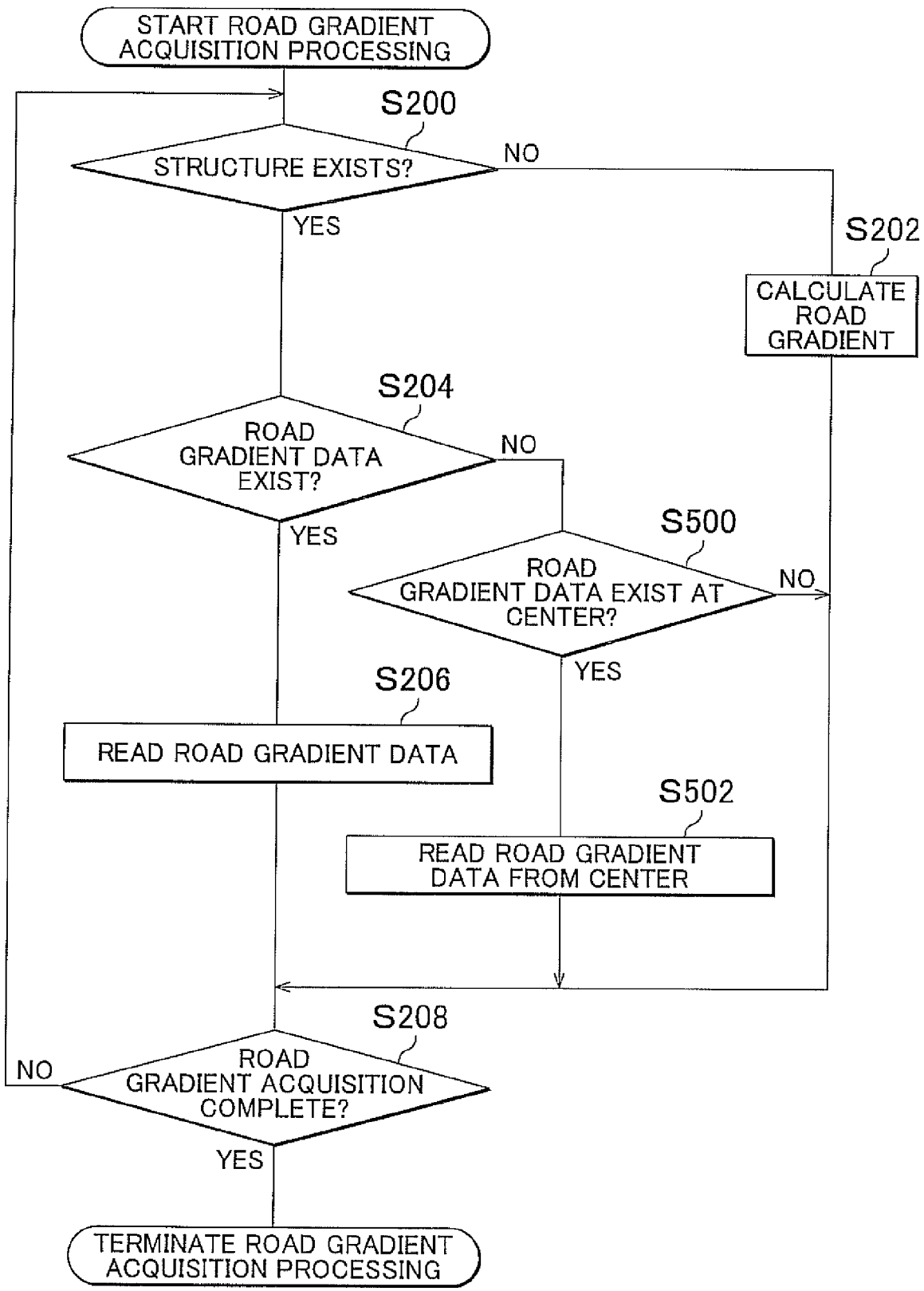
FIG. 12 is a flowchart showing road gradient acquisition processing included in the road information acquisition processing executed by the road information acquisition device according to the second embodiment.

Next, an operation of the road information acquisition device 50 according to the second embodiment will be described with reference to FIGS. 11 and 12. FIG. 11 is a flowchart showing road elevation acquisition processing included in road information acquisition processing executed by the road information acquisition device 50 according to the second embodiment. FIG. 12 is a flowchart showing road gradient acquisition processing included in the road information acquisition processing executed by the road information acquisition device 50 according to the second embodiment. Note that in the operation of the road information acquisition device 50 according to the second embodiment, only road elevation acquisition processing, road gradient acquisition processing, and road information learning processing differ from their counterparts in the first embodiment, and all other processing is identical to the processing performed from S10 to S24 of the first embodiment, shown in FIG. 2.

In the road information acquisition device 50 according to the second embodiment, when it is determined in S106 of the road elevation acquisition processing, as shown in FIG. 11, that the road elevation is not stored in the database 8, the routine proceeds to road elevation storage determination processing (S400). The processing of S400 is executed by the road information storage determination unit 23 to determine whether or not road elevation data relating to the coordinate point at which the structure was determined to exist in S100 are stored at the center 51. When it is determined in S400 that the road elevation data do not exist, the routine proceeds to the acquisition completion determination processing (S110) without performing road elevation acquisition. When it is determined in S400 that the road elevation data exist, on the other hand, the routine proceeds to road elevation data reading processing (S402).

The processing of S402 is executed by the stored road information reading unit 24 to read the road elevation data relating to the subject coordinate point at which the structure was determined to exist in S100 from the center 51. When the processing of S402 ends, the routine proceeds to the acquisition completion determination processing (S110).

Further, in the road information acquisition device 50 according to the second embodiment, when it is determined in S204 of the road gradient acquisition processing, as shown in FIG. 12, that the road gradient data do not exist, the routine proceeds to road gradient storage determination processing (S500). The processing of S500 is executed by the road information storage determination unit 23 to determine whether or not road gradient data relating to the coordinate point at which the structure was determined to exist in S200 are stored at the center 51. When it is determined in S500 that the road gradient data do not exist, the routine proceeds to the acquisition completion determination processing (S208) without obtaining the road gradient. When it is determined in S500 that the road gradient data exist, on the other hand, the routine proceeds to road gradient data reading processing (S502).

The processing of S502 is executed by the stored road information reading unit 24 to read the road gradient data relating to the subject coordinate point at which the structure was determined to exist in S200 from the center 51. When the processing of S502 ends, the routine proceeds to the acquisition completion determination processing (S208).

Further, in the road information acquisition device 50 according to the second embodiment, the road information storage determination processing (S302), shown in FIG. 5, as one process of the road information learning processing, determines whether or not the second road information exists in the database 8 and whether or not the second road information exists at the center 51. Furthermore, during the road information learning processing (S304), the road elevation and road gradient of the currently traveled road are obtained and output to the database 8 to be stored as road information data, and also output to the center 51 for storage therein.

Hence, with the road information acquisition device 50 according to the second embodiment, the second road information can be obtained from the center 51 disposed outside of the host vehicle, and therefore second road information learned by another vehicle, for example, can also be stored, whereby newer information can be obtained in comparison with a case in which only the database 8 provided in the host vehicle is used.

On the other hand, when the second road information is obtained from the database 8 provided in the host vehicle, road information can be obtained reliably in cases where communication with the center 51 becomes impossible by obtaining the second road information from the database provided in the host vehicle.

The invention is not limited to the embodiments described above.

For example, in the above embodiments, the second road information is learned during the road information learning processing only when the road information data do not exist in the database 8 or the center 51, but the second road information may be learned even when the road information data exist. By learning repeatedly in this manner, an improvement in precision is achieved. Moreover, only second road information relating to structures is learned, but second road information relating to locations other than structures may also be learned.

Further, in the above embodiments, a control schedule for performing efficient travel control is set by obtaining road information, but in addition thereto, a fuel consumption may be calculated on the basis of the road information and the driver may be informed thereof.

What is claimed is:

1. A road information acquisition device comprising:
a surface elevation acquisition unit that obtains a surface elevation;
a road information acquisition unit that calculates a first road information relating to a subject coordinate point of a travel route to be traveled by a host vehicle on the basis of the surface elevation;
a structure determination unit that determines whether or not a structure exists on the travel route;
a database installed in the host vehicle, the database having road elevation data stored therein, the road elevation data is used as a second road information, the second road information relates to the subject coordinate point at which the structure exists on the travel route, the second road information is different from the first road information; and
a road information learning unit;
wherein, when the structure determination unit determines that the structure exists on the travel route, the road information acquisition unit obtains the second road information, and the road information acquisition unit does not calculate the first road information as information relating to the subject coordinate point at which the structure exists on the travel route, and the structure determination unit determines whether or not road elevation data relating to the subject coordinate point at which the structure exists is stored in the database, and when the road elevation data exists in the database the road information acquisition unit obtains the road elevation data as the second road information;
wherein the road information learning unit learns the second road information relating to the travel route on which the structure exists as the host vehicle travels the travel route.

2. The road information acquisition device according to claim 1, wherein, when the second road information relating to the travel route to be traveled by the host vehicle is not stored in the database, the road information acquisition unit obtains the second road information from an information storage unit existing outside of the host vehicle.

3. The road information acquisition device according to claim 1, wherein the road information acquisition unit obtains the second road information from an information storage unit existing outside of the host vehicle.

4. The road information acquisition device according to claim 1, wherein the road information acquisition unit calculates the first road information relating to the travel route only when the structure determination unit determines that the structure does not exist on the travel route.

5. The road information acquisition device according to claim 1, wherein the first and second road information is a road elevation.

6. The road information acquisition device according to claim 1, wherein the first and second road information is a road gradient.

7. The road information acquisition device according to claim 1, further comprising a setting unit that obtains at least one of a travel control schedule for the host vehicle and a fuel consumption of the host vehicle on the basis of the first road information and/or the second road information obtained by the road information acquisition unit.

8. A road information acquisition method comprising:
   obtaining a surface elevation;
   calculating a first road information relating to a subject coordinate point of a travel route to be traveled by a host vehicle on the basis of the surface elevation;
   determining whether or not a structure exists on the travel route;
   obtaining a second road information when the structure is determined to exist on the travel route, the second road information relates to a road elevation of the subject coordinate point at which the structure exists on the travel route, the second road information is different from the first road information; and
   learning the second road information relating to the travel route on which the structure exists as the host vehicle travels the travel route;
   wherein, when it is determined that the structure exists on the travel route the first road information is not calculated as information relating to the subject coordinate point at which the structure exists on the travel route, and determining whether or not road elevation data relating to the subject coordinate point at which the structure exists is stored in a database installed in the host vehicle, and when the road elevation data exists in the database the second road information is obtained as the road elevation data.

* * * * *